US005626889A

United States Patent [19]

Bittner

[11] Patent Number: 5,626,889

[45] Date of Patent: May 6, 1997

[54] SINGLE TAPERED DIE MOUNT

[75] Inventor: Oszkar Bittner, Muncy, Pa.

[73] Assignee: Andritz Sprout-Bauer, Inc., Muncy, Pa.

[21] Appl. No.: 365,897

[22] Filed: Dec. 29, 1994

[51] Int. Cl.[6] .......... B29B 9/00

[52] U.S. Cl. .......... 425/186; 425/192 R; 425/308; 425/310; 425/337; 425/382 R; 425/382.3; 425/DIG. 230

[58] Field of Search .......... 425/183, 186, 425/191, 192 R, 308, 310, 314, 382 R, 382.3, DIG. 230, 331

[56] References Cited

U.S. PATENT DOCUMENTS

| | | | |
|---|---|---|---|
| 1,744,130 | 1/1930 | McChesney et al. | 425/191 |
| 2,798,444 | 7/1957 | Meakin | 425/DIG. 230 |
| 3,559,238 | 2/1971 | Gilman | 425/186 |
| 3,581,678 | 6/1971 | Landers | 425/DIG. 230 |
| 3,932,091 | 1/1976 | Vink | 425/331 |
| 3,981,664 | 9/1976 | Bittner et al. . | |
| 4,022,563 | 5/1977 | Spencer | 425/DIG. 230 |
| 4,111,632 | 9/1978 | Leaver . | |
| 4,226,578 | 10/1980 | Grobli et al. | 425/186 |
| 4,496,298 | 1/1985 | Munch | 425/331 |
| 4,556,381 | 12/1985 | Walter | 425/DIG. 230 |
| 4,979,887 | 12/1990 | Groebli et al. | 425/191 |

FOREIGN PATENT DOCUMENTS

| | | | |
|---|---|---|---|
| 0043140 | 1/1982 | European Pat. Off. | 425/331 |

OTHER PUBLICATIONS

Andritz Sprout–Bauer, Brochure No. 5000. Dated: Jan. 1992.

*Primary Examiner*—Khanh P. Nguyen
*Attorney, Agent, or Firm*—Chilton, Alix & Van Kirk

[57] ABSTRACT

The single tapered die mount employs a radially inner surface at an angle to the axis of rotation of the die mount, die and die holder. The radially inner surface of the die mount acts on an annular shoulder of the die to support and position the die in the die holder. The die mount of the invention is located between the radially outer surface of the die and the extended lip of the die housing. In the preferred embodiment of the invention, the radially inner surface of the die mount in contact with the radially outer surface of the die shoulder has an angle of a modified Morse taper. The radially outer surface of the die shoulder is machined to a matching angle.

4 Claims, 3 Drawing Sheets

SINGLE TAPERED DIE MOUNT

BACKGROUND OF THE INVENTION

This invention relates to the field of pelletizers for food processors. In particular, this invention relates to the mounting of dies in a food pelletizer.

Pelletizers are well-known in the field of food and feed processing. A conventional pelletizer comprises a two part die housing supporting a cylindrical shaped annular die. The die has a radially inner face and radially outer face with slots between the two faces. The die housing supports the edges of the die. The die housing is rotatably mounted to a frame. The die and die housings together define an interior pelletizing chamber. Located within the pelletizing chamber are a series of rollers supported by a roller frame. The roller frame is fixed and rotatably supports the rollers in intimate contact with the radially inner surface of the die. The die housing is driven by a motor or other mechanism to produce rotation of the annular die. The rollers, not being directly driven, are in contact with the radially inner surface of the die and are caused to rotate by the motion of the die.

Conditioned feed material is introduced into the pelletizing chamber. The feed is then captured between the rollers and the radially inner surface of the die. The rollers next extrude the feed through the slots in the die. Knives or cutters are located around the radially outer surface of the die to shear the extruded feed material from the radially outer surface of the die to form pellets.

In a conventional pelletizer, the die housing contacts the edges of the annular die and extends in a manner to form a lip in close contact with at least a portion of the outer circumferential surface of the die. In some designs, the die and die housing are in direct contact along the die edges and portions of the radially outer surface of the die. Direct contact results in wear on both components. Wear of the components is reduced by hardening either or both of the die and die housing. As the components wear, they are re-machined for proper fit. Each re-machining decreases the operational life of the component. Additionally, the machining must be to high standards to preserve component alignment and therefore rotational balance.

In other prior designs, located between the outer circumferential surface of the die and the extended lip of the die housing is a die mount. The edge of the die continues to directly contact the die housing. The die mount or wear ring is employed between the die and die housing to extend the operational life of a particular die. Vibration and flexing of the die and die housing during operation of the pelletizer results in wear of the die mount. The die mount is intended to take up the wear that would normally be experienced by the die and therefore extend the operating life of the die. Die mounts are of a lower cost than dies, and therefore decrease the operating expense of a pelletizer.

A conventional die mount is of cylindrical construction with a rectangular cross section. The longer axis of the cross sectional rectangle is parallel to an axis of rotation defined by the die mount, die and die housing. While employment of the die mount is superior to direct die to die housing contact on the radially outer surface of the die, several disadvantages do exist from the present design. To preserve rotational balance, the die, die housing and wear ring must be manufactured to relatively high tolerances so as to preserve rotational balance. The cylindrical die mount requires periodic remachining to maintain high tolerances and therefore proper balance. Even slight variations in manufacturing tolerances can result in misalignment of the components and the inability to secure the components together for operation of the pelletizer. Even during set up of correctly machined components, the large sizes of the die and die holder can easily result in misalignment during assembly of the components. Misalignment of the components produces destructive imbalances during operation of the pelletizer.

SUMMARY OF THE INVENTION

Briefly stated, the single tapered die mount of the present invention acts as an improved wear ring for supporting an annular die in a die housing of a pelletizer. The single tapered die mount employs a radially inner surface at an angle to the axis of rotation of the die mount, die and die holder. The radially inner surface of the die mount acts on an annular shoulder of the die to support and position the die in the die holder. The die mount of the invention is located between the radially outer surface of the die and the extended lip of the die housing.

In the preferred embodiment of the invention, the radially inner surface of the die mount in contact with the radially outer surface of the die shoulder has an angle of a modified Morse taper. The radially outer surface of the die shoulder is machined to a matching angle. A modified Morse taper is a taper of 4°–5°. A conventional Morse taper is on the order of 3°. A modified Morse taper is employed instead of a conventional Morse taper in these circumstances due to the large diameter of the annular die. Use of a small taper, such as an unmodified Morse taper of 3°, would allow excessive misalignment of the die relative to the die mount during set-up and assembly.

The die mount of the preferred embodiment of the invention is not fabricated as a complete circular ring. Instead, the die mount is constructed as two halves of a circular ring to simplify installation. Additionally, the die mount is constructed to have an upstanding portion on the radially outer surface of the die mount. This upstanding portion or ring shoulder fits into a groove machined in the radially inner surface of the extended die holder lip. The result is that the die mount fits into the die holder like a two part snap ring. The ability of the die mount to remain seated in the die holder during assembly results in less complicated and faster set up of the pelletizer during die installation.

DETAILED DESCRIPTION OF THE DRAWINGS

Figure 1:
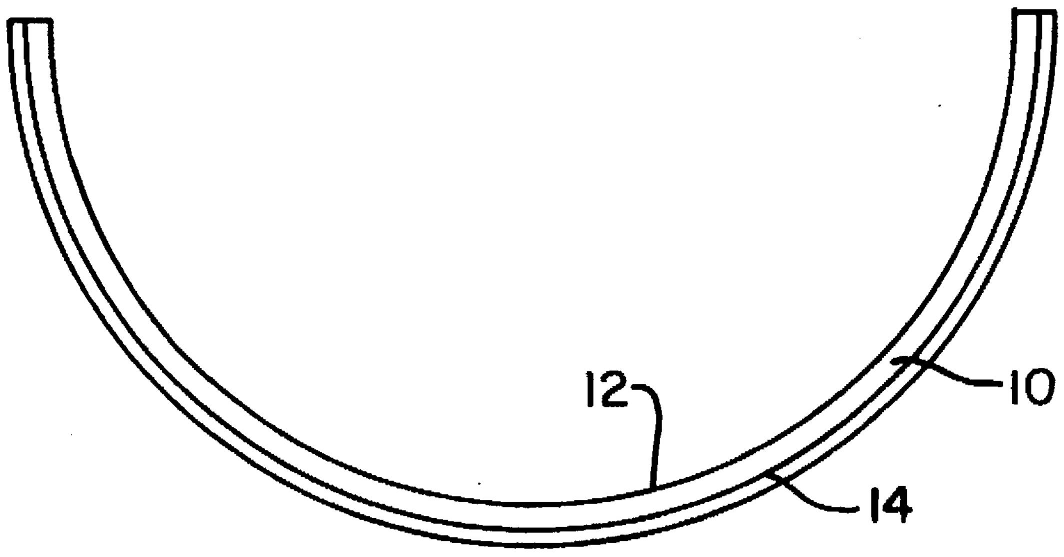
FIG. 1 is a plan view of the half circular die mount of the invention.
Figure 2:
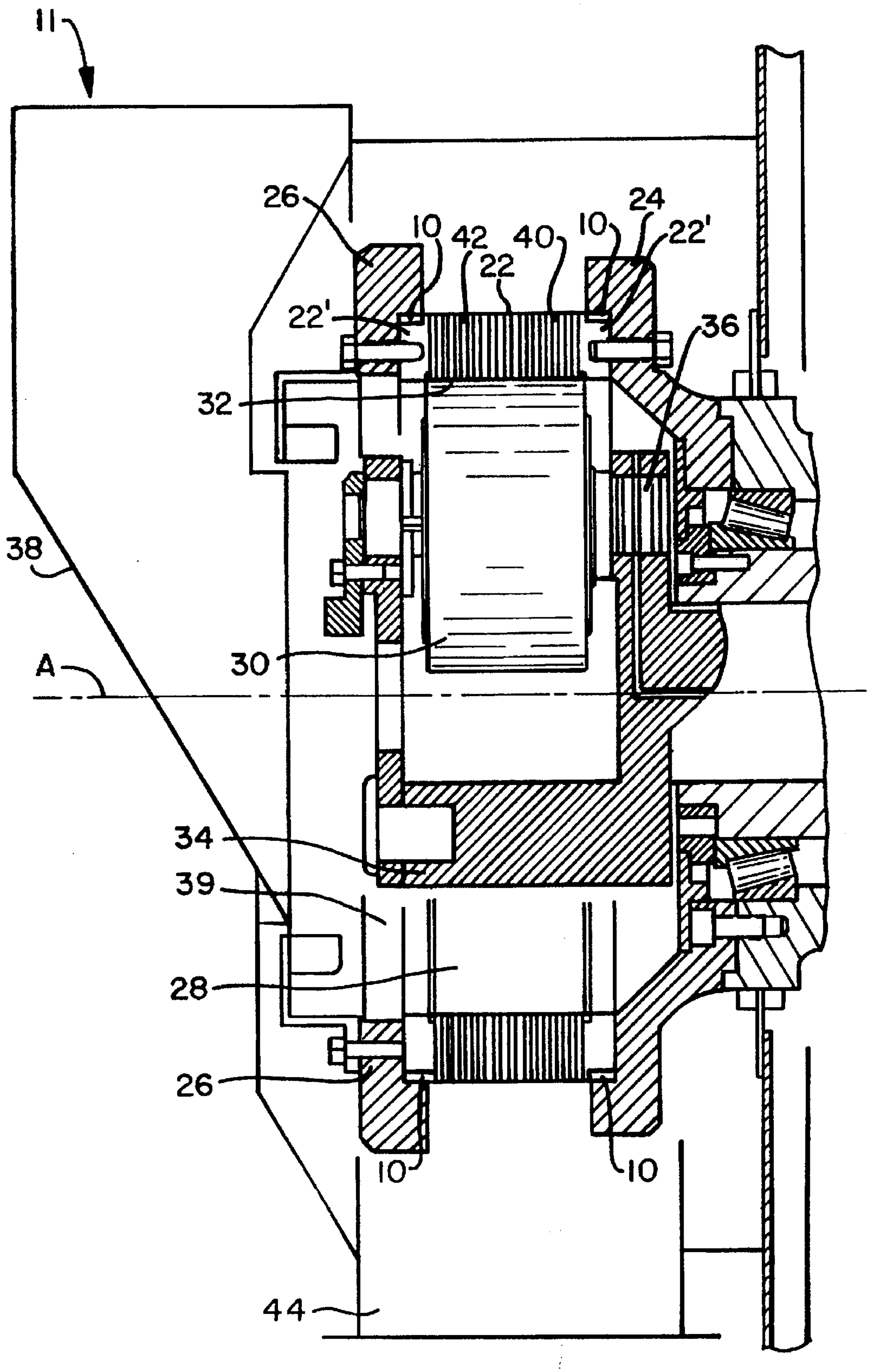
FIG. 2 is a partial cross-sectional view of a pelletizer having the die mount of FIG. 1.
Figure 3:
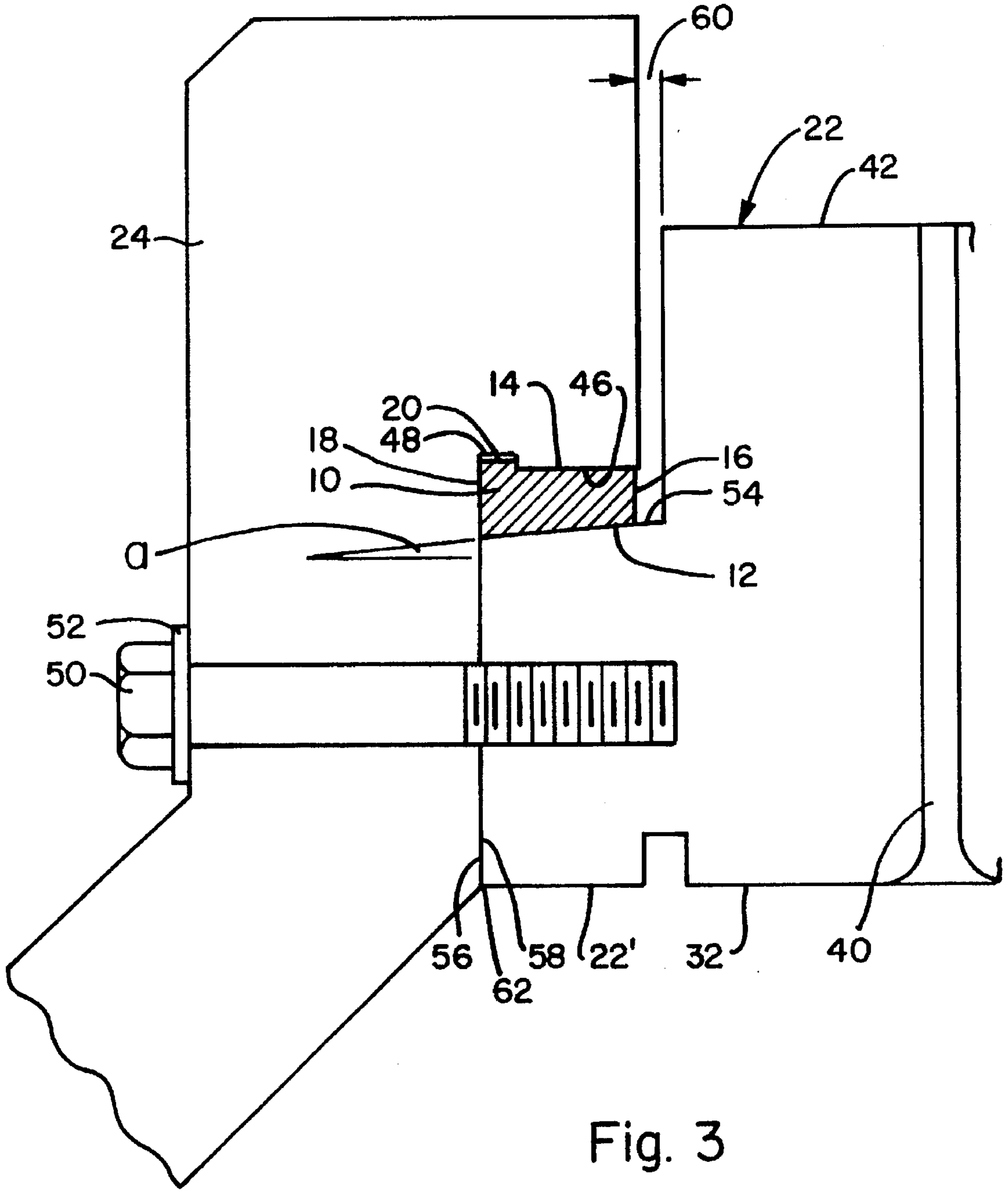
FIG. 3 is an enlarged fragmentary view of a portion of FIG. 2.

Wherein like parts are represented by like numerals throughout the figures, the single tapered die mount of the invention is generally depicted as 10 in FIGS. 1–3.

In the preferred embodiment, the single tapered die mount is constructed as two half-circles for simplification of installation into the die housing. The die mount defines a radially inner surface 12 and a radially outer surface 14. Additionally, the die mount defines an interior side 16 toward the center line of the die and an exterior side 18 toward the die holder. The die mount has a center of radius on the axis of rotation A of a pelletizer 11 and a radius of the die mount which is generally perpendicular to the axis A. The radially inner surface 12 of the die mount 10 has an acute angle of 4°–5° when measured from the axis of rotation A of the pelletizer to define a modified Morse taper.

In the preferred embodiment of the invention, the die mount also defines a snap ring ridge 20 located on the radially outer surface 14 of the die mount 10.

A pelletizer employing the single tapered die mount 10 is constructed with the die 22 located between die holders 24, 26. Each die holder 24, 26 is constructed with a radially inner lip 46 for the support of the die holder 10. In the preferred embodiment, a snap ring groove 48 is machined into the radially inner lip 46 of the die holder.

The die 22 includes annular shoulders 22' which project toward the die holders 24, 26 and are received within the die holder lips 46.

The die 22 and the two die holders 24, 26 define an interior pelletizing chamber 28. Located within the pelletizing chamber 28 are rollers 30. The rollers 30 are rotatably supported in intimate contact with the radially inner surface 32 of the annular die 22 by a roller frame. The rollers 30 are not independently driven. During operation of the pelletizer, the roller frame 34 is supported in a fixed position. A motor (not shown) rotates the die and die mount around the axis of rotation A and therefore also around the fixed roller frame 34. Due to a rolling friction contact of the rollers 30 on the radially inner surface 32 of the die 22, the rollers 30 are caused to rotate on bearings 36.

Conditioned feed is introduced to the pelletizer at the hopper 38. The feed passes through openings 39 in the die holder 26 and into the pelletizing chamber 28. The feed material is then captured between the rollers 30 and the radially inner surface 32 of the die 22. The rollers 30 then extrude the feed through slots 40 in the die 22. Located near the radially outer surface of the die 42 are knives or other means (not shown) for shearing the extruded feed material from the die 22 to form pellets. The pelletized feed then falls from the die and is collected through a chute 44 for further processing or packaging.

The installation procedure and positioning for the proper set up of the tapered die mount is important for proper operation of the pelletizer 11. To begin set-up of a pelletizer 11 employing a single tapered die mount, a pair of half-circle die mounts 10 are snap fit into each of the die holders 24, 26. The annular die 22 is then placed between the die holders 24, 26. During the set-up of the die, die mount and die holder, a ⅛ inch inner gap at 62 should exist between the die shoulder side face 56 and the die holder side face 58. The bolts 50, having washers 52, are then torqued to draw the side faces 56 of die shoulders 22' and the side faces 58 of the die holders 24 and 26 into compressive contact without taking up all of the outer gap 60 having a width which extends in the axial direction between the die and die holder. The pelletizer 11 is then ready for operation.

The die 22 shoulder 22' has a radially outer support surface 54 machined to a matching angle with that of the radially inner surface 12 of the single tapered die mount 10. For the proper gap of about 1/16 to ¼ inch, preferably ⅛ inch to exist, the tolerances of the die, die holders and tapered die mount must be carefully held. Should a gap of more than ¼ inch exist between the die shoulder face 56 and the die holder during set-up, excessive misalignment could occur between the two components leading to rotational imbalance of the system and improper running of the pelletizer. A small gap at 62 and the shallow angle of 4°–5° on the wedge-like surfaces 12, 54, allow the bolts to "seize up" the mounting system while maintaining concentricity.

Once the components are torqued together with bolt 50, the drive or torque load is supported by the mated die shoulder side face and die holder side face surfaces 56, 58. The radial load is supported by the compressive contact between the die mount at 14 and the lip surface 46 of the die holder. Any wear within the mounting system occurs on the die mount 10 which is less costly and easier to replace than an entire die.

What is claimed is:

1. A pelletizer comprising:

a frame;

a die holder rotatably mounted to said frame, said holder defining an axis of rotation, said die holder further defining a die holder side face substantially perpendicular to said axis and a lip extending from said die holder side face and defining a die holder radially inner surface;

a die mount in contact with said die holder radially inner surface, said die mount defining a die mount radially inner surface at an acute angle to said axis of about 4°–5° defined from said axis in a direction extending from opposite said lip;

an annular die having an annular shoulder projecting toward the die holder and received within the die holder lip and having a radially outer surface tapered with an angle substantially equal to the acute angle of the die mount inner surface, and in compressive contact with said die mount radially inner surface and in compressive contact with said die holder side face; and means extending through said die holder side face and engaging said die shoulder for drawing said die and die holder toward each other wherein said die holder radially inner surface includes a groove; and said die mount further comprises a ridge fitting in said groove.

2. The pelletizer of claim 1, wherein the means for drawing said die and die holder toward each other comprises a bolt passing through said die holder into said die shoulder.

3. The pelletizer of claim 2, wherein a gap having a width in the axial direction is defined between said die holder lip and said die, after said compressive contacts have been established.

4. The pelletizer of claim 1, wherein a gap having a width in the axial direction is defined between said die holder lip and said die, after said compressive contacts have been established.

* * * * *